US012492795B1

(12) United States Patent
Wu

(10) Patent No.: US 12,492,795 B1
(45) Date of Patent: Dec. 9, 2025

(54) LENS MODULE AND CAR LIGHT HAVING THE SAME

(71) Applicant: COPLUS INC., Tainan (TW)

(72) Inventor: Po-Hua Wu, Tainan (TW)

(73) Assignee: COPLUS INC., Tainan (TW)

( * ) Notice: Subject to any disclaimer, the term of this patent is extended or adjusted under 35 U.S.C. 154(b) by 0 days.

(21) Appl. No.: 18/919,678

(22) Filed: Oct. 18, 2024

(30) Foreign Application Priority Data

Jul. 25, 2024 (TW) ................................ 113127663

(51) Int. Cl.
*F21S 41/29* (2018.01)
*F21S 41/147* (2018.01)
*F21S 41/20* (2018.01)
*F21S 41/25* (2018.01)
*F21S 41/255* (2018.01)
(Continued)

(52) U.S. Cl.
CPC .......... *F21S 41/295* (2018.01); *F21S 41/147* (2018.01); *F21S 41/27* (2018.01); *F21S 41/32* (2018.01); *F21S 45/47* (2018.01); *F21S 41/25* (2018.01); *F21S 41/255* (2018.01); *F21S 41/26* (2018.01); *F21S 41/265* (2018.01); *F21S 41/275* (2018.01); *F21S 41/285* (2018.01); *F21S 41/29* (2018.01); *F21S 45/48* (2018.01); *F21S 45/49* (2018.01); *F21V 5/00* (2013.01); *F21V 5/04* (2013.01); *F21V 17/005* (2013.01);
(Continued)

(58) Field of Classification Search
CPC .......... F21S 41/25; F21S 41/255; F21S 41/26; F21S 41/265; F21S 41/27; F21S 41/275; F21S 41/285; F21S 41/29; F21S 41/295; F21S 45/47; F21S 45/48; F21S 45/49; F21V 5/00; F21V 5/04; F21V 17/005; F21V 17/104; F21V 17/12; F21V 17/162
See application file for complete search history.

(56) References Cited

U.S. PATENT DOCUMENTS

2013/0188380 A1* 7/2013 Sekiguchi ............... F21V 13/12 362/516
2016/0146423 A1* 5/2016 Lai .......................... F21S 41/19 362/520
(Continued)

FOREIGN PATENT DOCUMENTS

KR 20190033857 A * 4/2019 ............ F21S 41/192

OTHER PUBLICATIONS

Machine translation of KR 20190033857 A retrieved from the FIT database of PE2E search. (Year: 2025).*

*Primary Examiner* — Colin J Cattanach
(74) *Attorney, Agent, or Firm* — Burris Law, PLLC

(57) ABSTRACT

A lens module includes a lens, and rear and front covers. The lens has a front lens portion and a rear lens portion connected to each other. The front lens portion has four vertices projecting away from an optical axis, such that the front lens portion has a four-pointed star shape. The rear lens portion has four notches. The rear cover is connected to the lens, and has a base portion, and two protruding wall portions defining a mounting hole that corresponds in shape to the lens. The lens is fittingly mounted in the mounting hole. Each of the protruding wall portions has two recessed portions. Each of the notches is engaged with a respective one of the recessed portions. The front cover is coupled to the rear cover, retains the lens therein, and has a light outlet hole exposing the front lens portion of the lens.

11 Claims, 8 Drawing Sheets

(51) Int. Cl.

| | |
|---|---|
| ***F21S 41/26*** | (2018.01) |
| ***F21S 41/265*** | (2018.01) |
| ***F21S 41/27*** | (2018.01) |
| ***F21S 41/275*** | (2018.01) |
| ***F21S 41/32*** | (2018.01) |
| ***F21S 45/47*** | (2018.01) |
| ***F21S 45/48*** | (2018.01) |
| ***F21S 45/49*** | (2018.01) |
| ***F21V 5/00*** | (2018.01) |
| ***F21V 5/04*** | (2006.01) |
| ***F21V 17/00*** | (2006.01) |
| ***F21V 17/10*** | (2006.01) |
| ***F21V 17/12*** | (2006.01) |
| ***F21V 17/16*** | (2006.01) |

(52) U.S. Cl.
CPC ............. *F21V 17/104* (2013.01); *F21V 17/12* (2013.01); *F21V 17/162* (2013.01)

(56) References Cited

U.S. PATENT DOCUMENTS

| | | | | |
|---|---|---|---|---|
| 2020/0248884 | A1* | 8/2020 | Iwasaki ................... | F21S 41/36 |
| 2023/0243480 | A1* | 8/2023 | Seiffge .................. | F21S 41/143<br>362/512 |

* cited by examiner

LENS MODULE AND CAR LIGHT HAVING THE SAME

CROSS-REFERENCE TO RELATED APPLICATION

This application claims priority to Taiwanese Invention Patent Application No. 113127663, filed on Jul. 25, 2024, the entire disclosure of which is incorporated by reference herein.

FIELD

The disclosure relates to a car accessory, and more particularly to a car light.

BACKGROUND

A conventional car light module includes a base seat, a reflective cover, a light source, a light cover and a lens. The reflective cover and the light source are disposed on the base seat. The light cover and the lens are mounted to the base seat. In accordance with current vehicular regulations, the conventional car light is required to be able to converge light; as such, the shape and curvature of the lens are carefully designed to adhere to the regulations. Circular lenses and elliptical lenses are the most commonly used lenses, as both are highly symmetrical and easier to design compared to lenses with other shapes.

However, since the components of the conventional car light are fixed to each other with an adhesive, it takes a lot of time to assemble the components as the adhesive requires time to dry after assembly. Furthermore, the adhesive is disadvantageous to maintenance or recycling of the conventional car light. Moreover, as most commercially available car light lens do not have shapes outside of circles or ellipses, there are very few options to choose from when the consumers pick car light shapes.

SUMMARY

Therefore, an object of the disclosure is to provide a lens module that can alleviate at least one of the drawbacks of the prior art.

According to the disclosure, the lens module includes a lens, a rear cover, and a front cover. The lens has a front lens portion and a rear lens portion connected to each other and arranged in a front-rear direction. The front lens portion has four vertices projecting away from an optical axis that extends in the front-rear direction through the front lens portion and the rear lens portion, such that the front lens portion has a four-pointed star shape. The rear lens portion has four notches that recess towards the optical axis. The rear cover is connected to the lens, and has a base portion and two protruding wall portions. The two protruding wall portions extend forwardly from the base portion and define a mounting hole that corresponds in shape to the lens. The lens is fittingly mounted in the mounting hole. Each of the protruding wall portions has two recessed portions that recess towards the optical axis. Each of the notches of the rear lens portion is engaged with a respective one of the recessed portions of the protruding wall portions. The front cover is coupled to the rear cover, retains the lens therein, and has a light outlet hole exposing the front lens portion of the lens.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
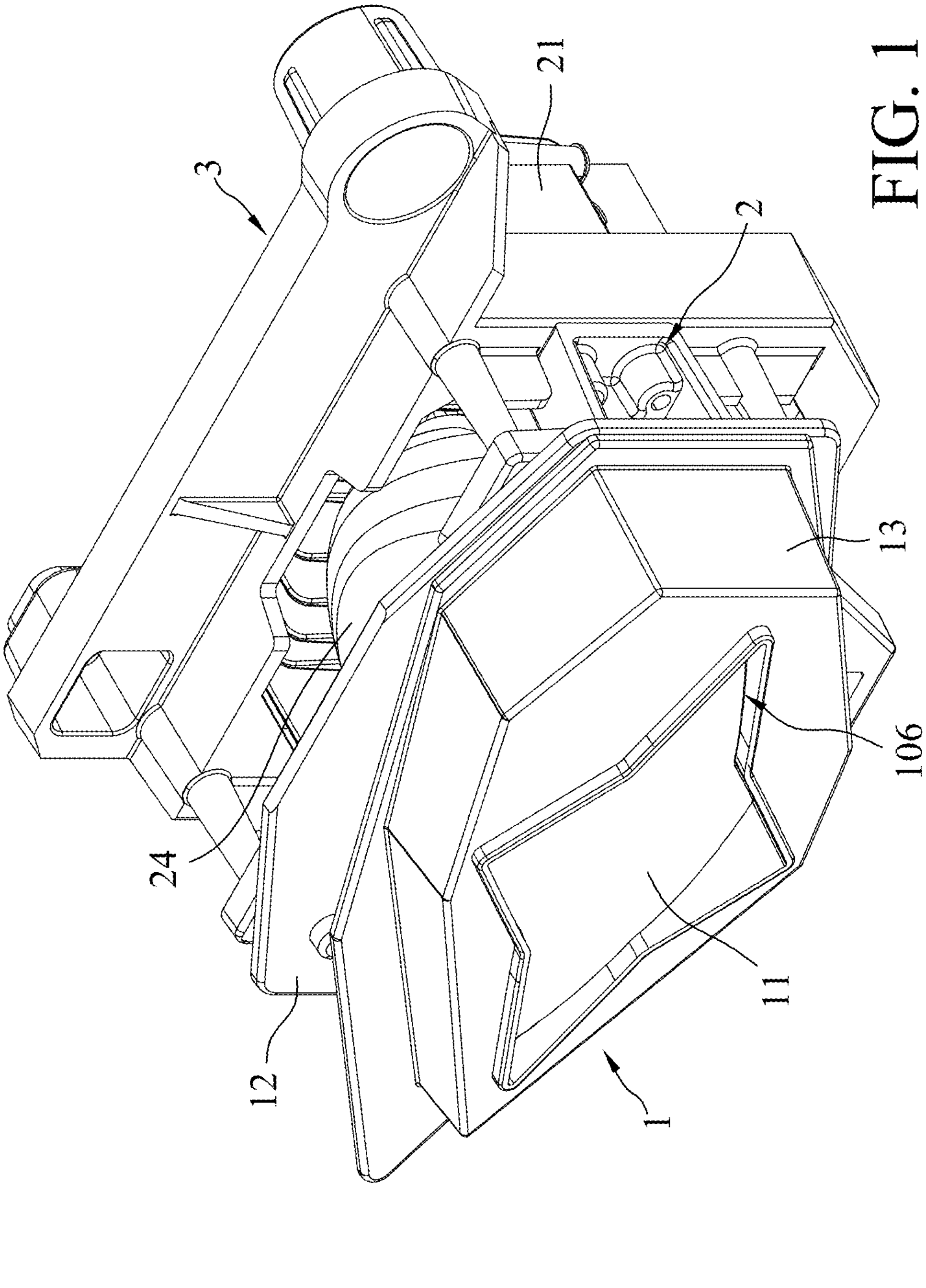
FIG. 1 is a perspective view illustrating an embodiment of a car light according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
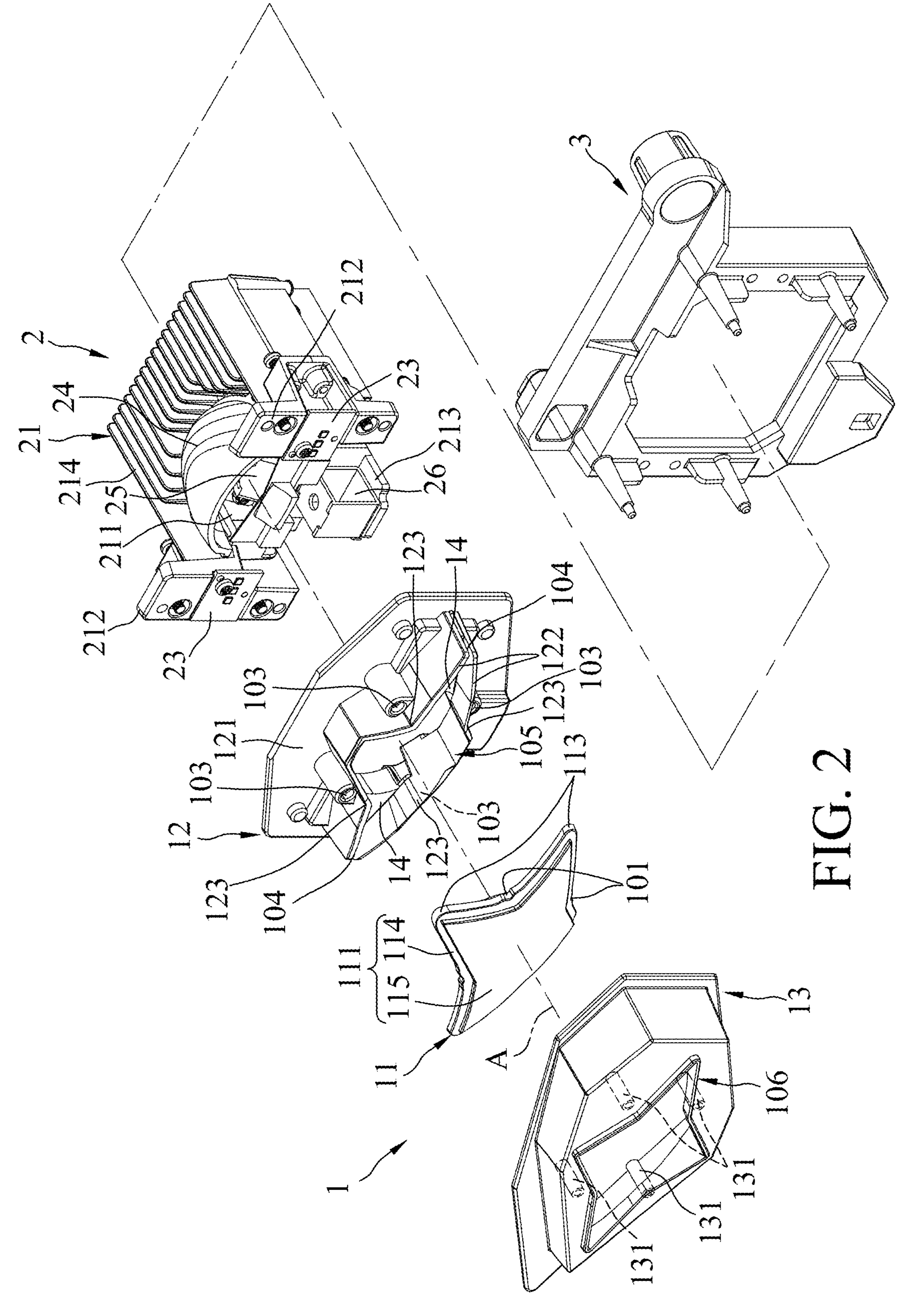
FIG. 2 is a partially exploded perspective view of the embodiment.
Figure 3:
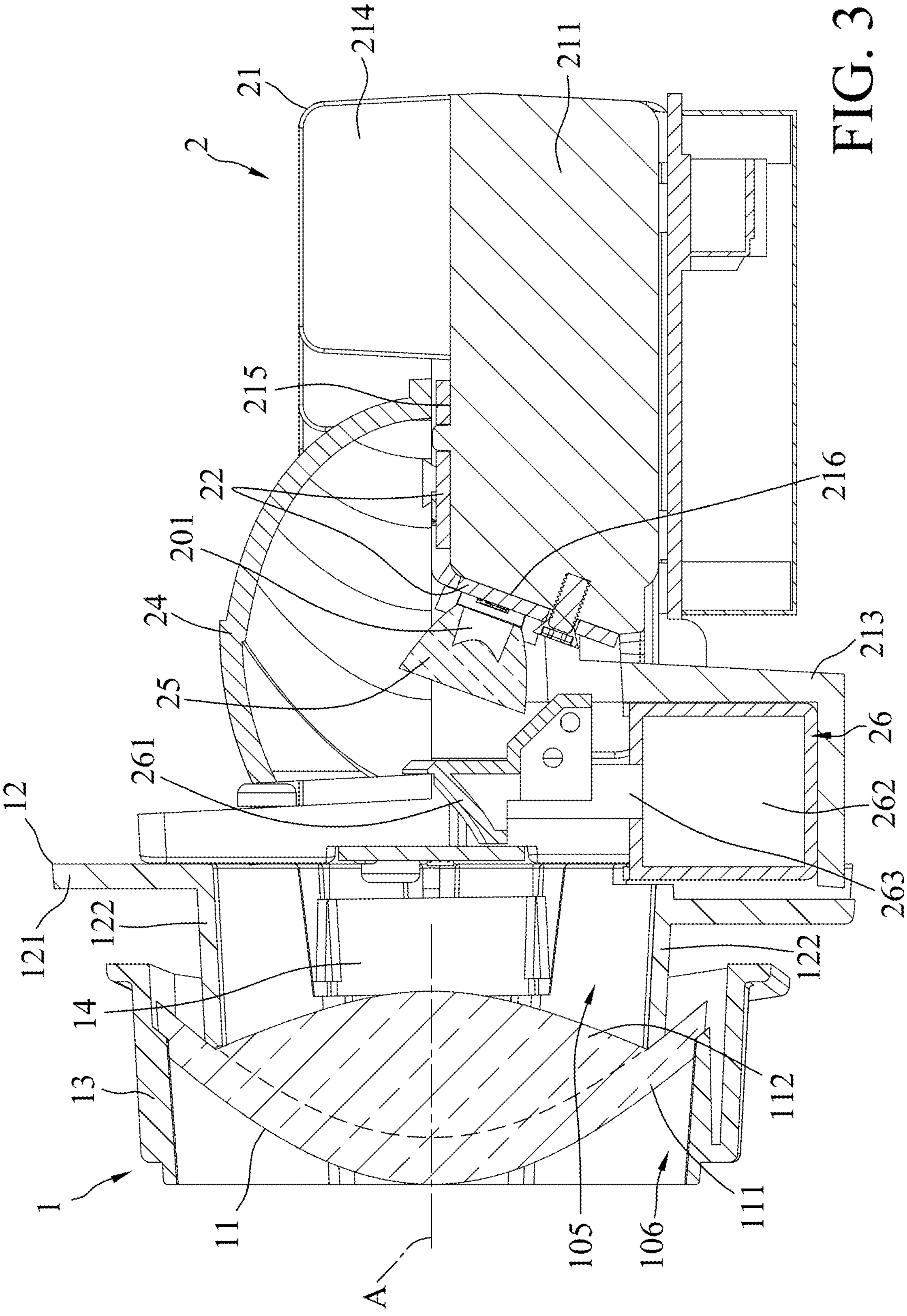
FIG. 3 is a sectional view of a lens module and a light source module of the embodiment.

Referring to FIGS. 1 to 3, an embodiment of a car light according to the disclosure includes a lens module 1, a light source module 2, and a frame 3.

Figure 4:
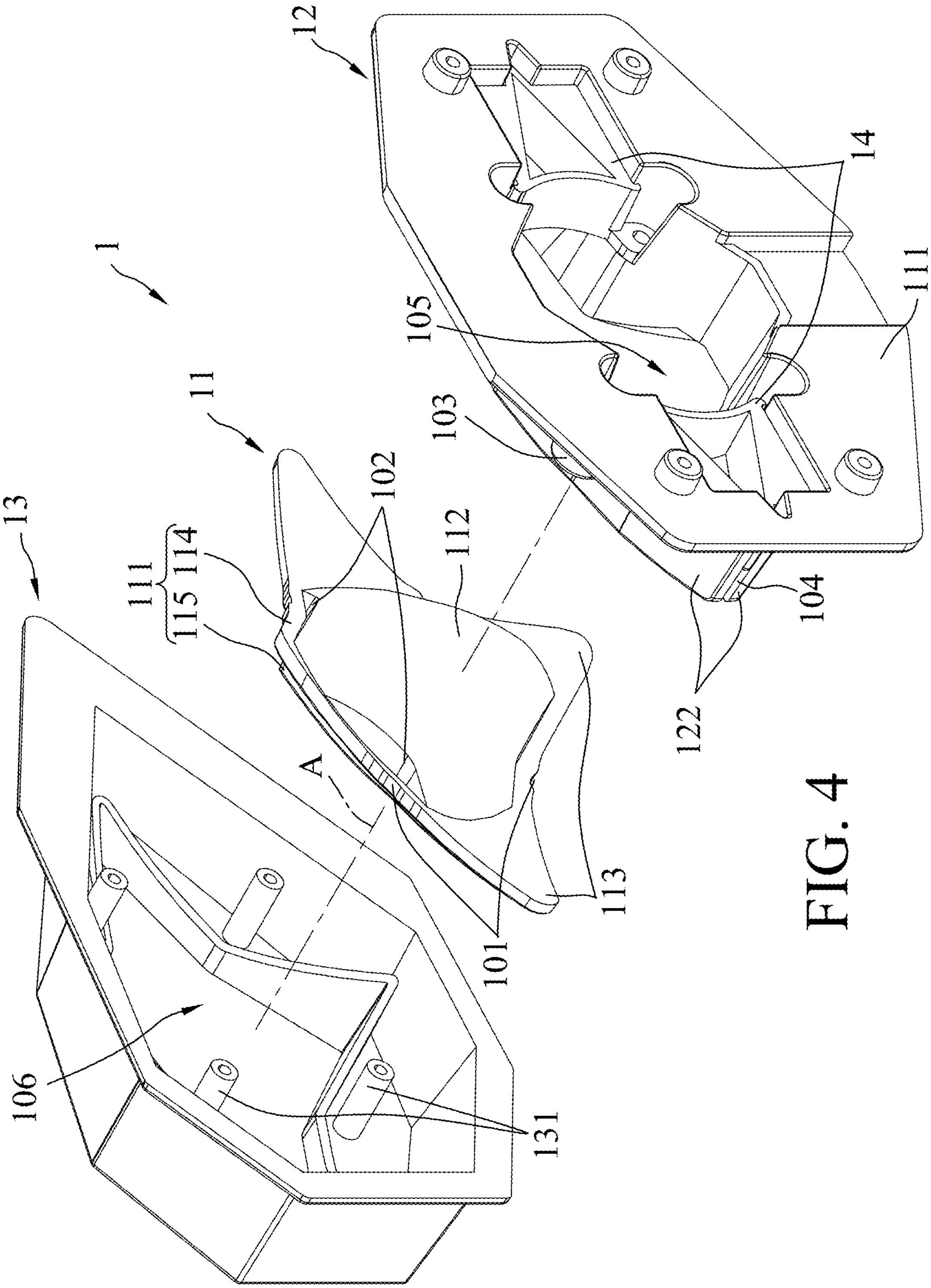
FIG. 4 is an exploded perspective view of the lens module.
Figure 5:
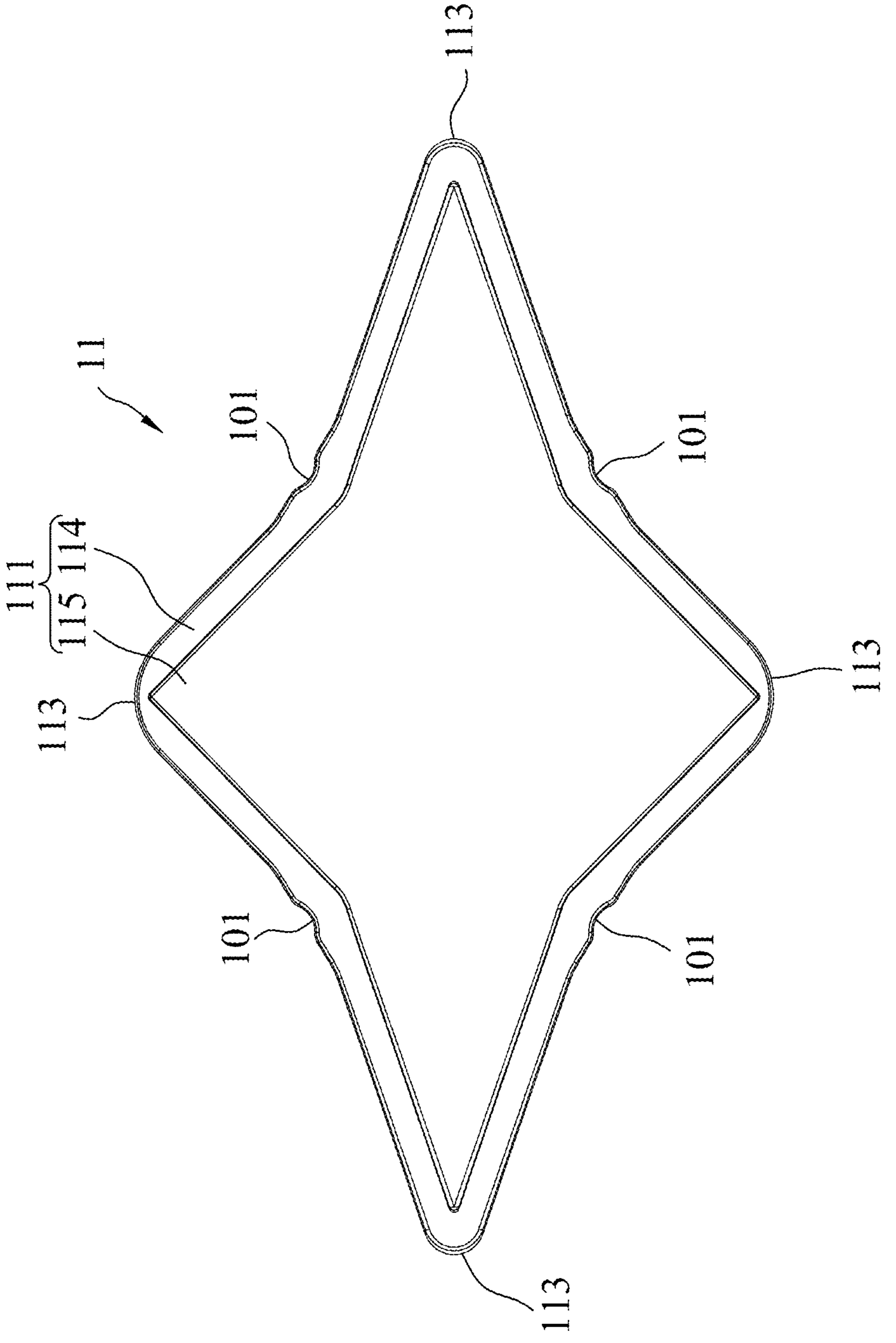
FIG. 5 is a front view of a lens of the embodiment.
Figure 6:
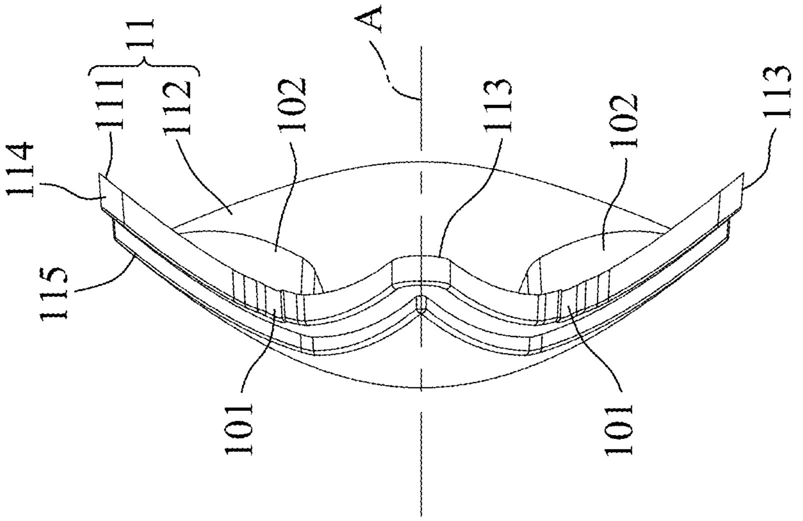
FIG. 6 is a side view of the lens.
Figure 7:
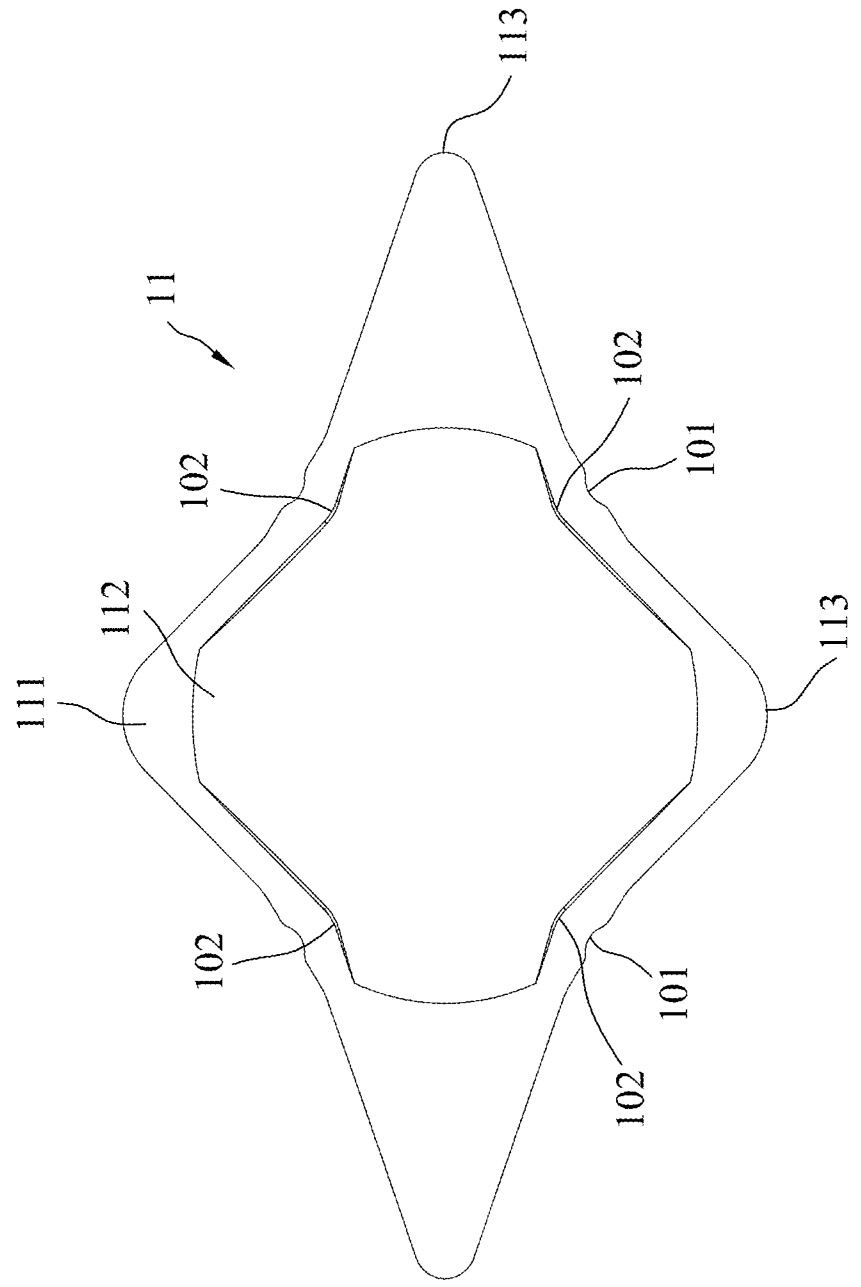
FIG. 7 is a rear view of the lens.

Referring to FIG. 4, the lens module 1 includes a lens 11, a rear cover 12, a front cover 13, and two second light-transmitting members 14. Referring further to FIGS. 5 to 7, the lens 11 has a front lens portion 111 and a rear lens portion 112 connected to each other and arranged in a front-rear direction. An optical axis (A) extends in the front-rear direction through the front lens portion 111 and the rear lens portion 112. The front lens portion 111 is formed as a curved plate and is curved forwardly. The front lens portion 111 has four vertices 113, a main body segment 114, a protruding segment 115, and a plurality of engaging grooves 101. The protruding segment 115 extends forwardly from the main body segment 114. The engaging grooves 101 recess towards the optical axis (A), and each of the engaging grooves 101 is disposed between a respective adjacent pair of the vertices 113. The rear lens portion 112 is a convex lens, and has four notches 102 that recess towards the optical axis (A). The notches 102 respectively correspond in position to the engaging grooves 101.

The vertices 113 project away from the optical axis (A) such that the front lens portion 111 has a four-pointed star shape in the front view (see FIG. 5). In other embodiments, a number of the vertices 113 may be changed as needed (e.g., the front lens portion 111 may have two vertices 113). Referring to FIG. 5, the lens 11 has a width ranging from 105 mm to 113 mm, and a height ranging from 60 mm to 66 mm. Referring to FIG. 6, the lens has a thickness of 20 mm to 24 mm in the front-rear direction. In other embodiments, the width, height, and thickness may be changed as needed.

Referring to FIGS. 2 to 4, the rear cover 12 is connected to the lens 11, and has a base portion 121, two protruding wall portions 122, and a plurality of pin holes 103. The protruding wall portions 122 extend forwardly from the base portion 121, are spaced apart in an up-down direction by two gaps 104 formed therebetween, and define a mounting hole 105 that corresponds in shape to the lens 11. The lens 11 is fittingly mounted in the mounting hole 105. Each of the protruding wall portions 122 has two recessed portions 123 that recess towards the optical axis (A). Each of the notches 102 of the rear lens portion 112 is engaged with a respective one of the recessed portions 123 of the protruding wall portions 122.

The front cover 13 is coupled to the rear cover 12, retains the lens 11 therein, and has a light outlet hole 106 exposing the front lens portion 111 of the lens 11. The main body segment 114 abuts against the front cover 13. Specifically, the protruding segment 115 is exposed from the light outlet hole 106. The front cover 13 includes a plurality of pins 131 disposed at a rear side thereof, and the pins 131 are respectively inserted into the pin holes 103 of the rear cover 12. The pins 131 are respectively engaged with the engaging grooves 101.

Figure 8:
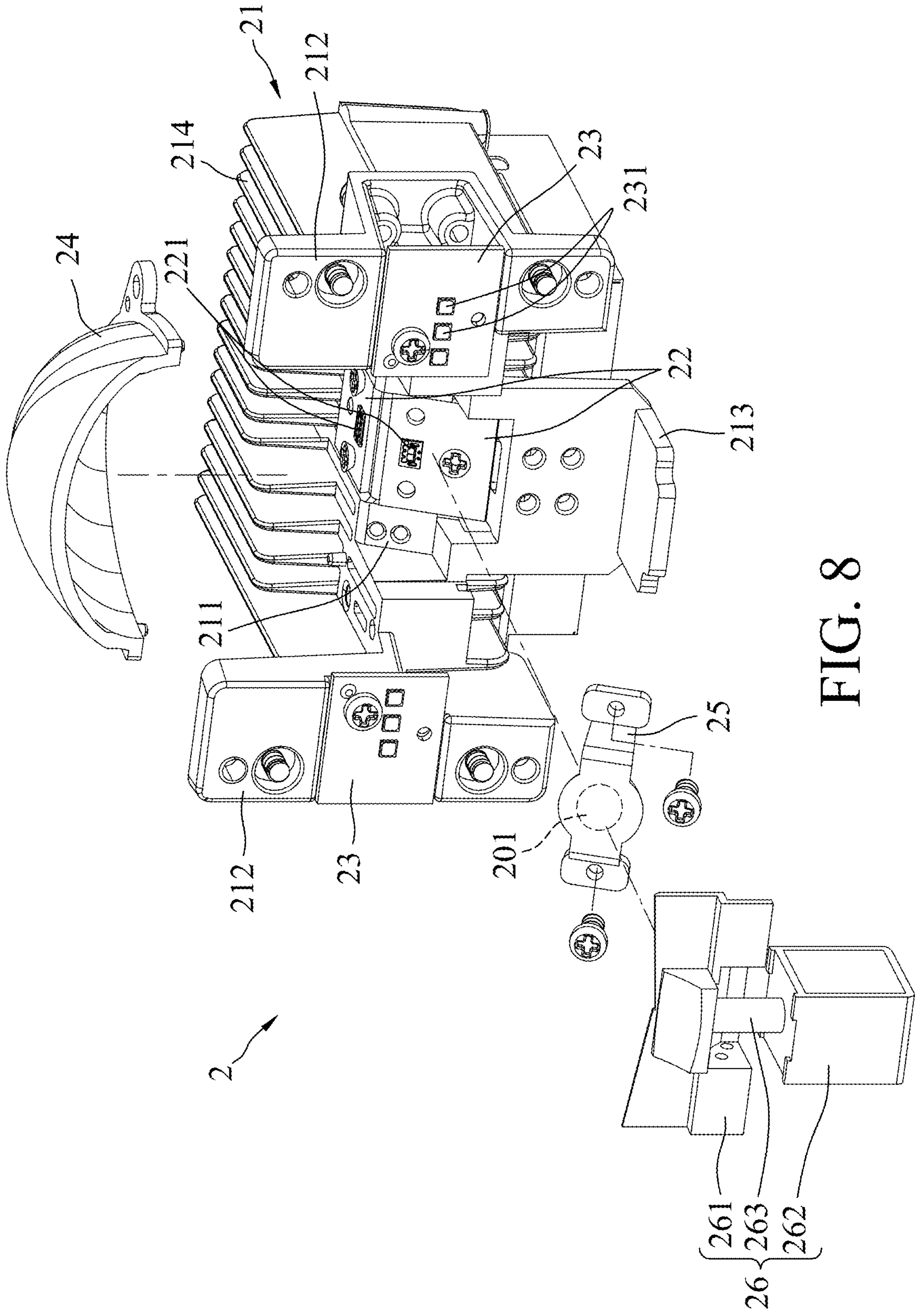
FIG. 8 is a partially exploded perspective view of the light source module.

Referring to FIGS. 3 and 8, the light source module 2 is disposed on the lens module 1 and opposite to the light outlet hole 106, and includes a heat sink 21, at least one first light source unit 22, two second light source units 23, at least one reflective cover 24, a first light-transmitting member 25, and a light type switching mechanism 26. In this embodiment, the at least one first light source unit 22 includes two first light source units 22, and the at least one reflective cover 24 includes one reflective cover 24.

The heat sink 21 has a base seat portion 211, two side wing portions 212, a hanging portion 213, and a heat sink fin portion 214. The side wing portions 212 are connected respectively to opposite left and right ends of the base seat portion 211. The hanging portion 213 is connected to a lower end of the base seat portion 211. The heat sink fin portion 214 is connected to a rear end of the base seat portion 211. The base seat portion 211 has a platform surface 215, and an inclined surface 216 extending downwardly from a front end of the platform surface 215 and inclined towards the light outlet hole 106. The first light source units 22 are mounted respectively to the platform surface 215 and the inclined surface 216. The reflective cover 24 is mounted to the base seat portion 211, is disposed over one of the first light source units 22 that is mounted to the platform surface 215, and is for reflecting and converging light. The first light-transmitting member 25 is mounted to the heat sink 21, is disposed in front of the other one of the first light source units 22 that is mounted to the inclined surface 216, and has a light converging hole 201 facing the other one of the first light source units 22.

In this embodiment, two of the vertices 113 are arranged in a top-bottom direction, and the remainder of the vertices 113 are arranged in a left-right direction. By virtue of the configurations of the first light source units 22, the reflective cover 24, and the first light-transmitting member 25, light is ensured to be transmitted through the vertices 113 that are arranged in the top-bottom direction, which increases uniformity of illumination of the car light.

It should be noted that, a number of the first light source units 22 is not limited to two, and may be changed as needed in other embodiments. In other embodiments, the number of first light source unit 22 may be one.

The second light source units 23 are respectively mounted to the side wing portions 212. The two second light-transmitting members 14 are embedded in the rear cover 12 and respectively correspond in position to two of the vertices 113 of the lens 11 that are arranged in the left-right direction. The mounting hole 105 exposes the second light-transmitting members 14. Each of the second light-transmitting members 14 is in front of a respective one of the second light source units 23 and is aligned with the corresponding one of the vertices 113 of the front lens portion 111 of the lens 11. In this embodiment, the exposed portion of each of the second light-transmitting members 14 corresponds in shape to the two of the vertices 113 of the front lens portion 111, and is substantially in a shape of a triangle in the front view. The second light-transmitting members 14 respectively extend into the gaps 104, and light uniformly passes through the two of the vertices 113 that are arranged in the left-right direction, thereby ensuring uniformity of illumination.

In this embodiment, each of the first light source units 22 has a first light-emitting diode (LED) chip 221, and each of the second light source units 23 has a plurality of second LED chips 231.

The light type switching mechanism 26 is disposed on the hanging portion 213, and includes a light type switching plate 261, an actuating unit 262, and a connecting rod 263 interconnecting the light type switching plate 261 and the actuating unit 262. The actuating unit 262 is operable to move the connecting rod 263 upwardly/downwardly, which drives the light type switching plate 261 to pivot upwardly/downwardly relative to the first light source units 22 to switch between low beam and high beam modes. The method of switching between the low beam and high beam modes is known in the prior art and is not a distinctive feature of the disclosure; hence, it will not be described in further detail.

The frame 3 is mounted to the side wing portions 212 of the heat sink 21, and surrounds the light source module 2.

It should be noted that, in this embodiment, a number of the engaging grooves 101, a number of the notches 102, a number of the pin holes 103, a number of the recessed portions 123, a number of the pins 131 are all four, but the numbers of the abovementioned components may be changed in other embodiments as needed, as long as the numbers of the engaging grooves 101, the pin holes 103, and the pins 131 are in correspondence to each other, and the numbers of the notches 102 and the recessed portions 123 are in correspondence to each other.

In conclusion, by having the car light assembled via the configurations of the front cover 13, the rear cover 12, and the lens 11 instead of the adhesives, an assembly time of the car light is shorter compared to that of the aforementioned conventional car light, and maintenance or recycle of the car light is easier. Furthermore, the configuration of the lens 11 allows the front lens portion 111 to have a star shape with four vertices 113 while still being able to converge light, and to not be limited to elliptical and circular shapes. Hence, the objective of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A lens module comprising:

a lens that has a front lens portion and a rear lens portion connected to each other and arranged in a front-rear direction, said front lens portion having four vertices, said vertices projecting away from an optical axis that extends in the front-rear direction through said front lens portion and said rear lens portion, such that said front lens portion has a four-pointed star shape, said rear lens portion having four notches that recess towards the optical axis;

a rear cover that is connected to said lens, and that has a base portion, and two protruding wall portions extending forwardly from said base portion, said protruding wall portions defining a mounting hole that corresponds in shape to said lens, said lens being fittingly mounted in said mounting hole, each of said protruding wall portions having two recessed portions that recess towards the optical axis, each of said notches of said rear lens portion being engaged with a respective one of said recessed portions of said protruding wall portions; and a front cover that is coupled to said rear cover, that retains said lens therein, and that has a light outlet hole exposing said front lens portion of said lens.

2. The lens module as claimed in claim 1, wherein said front lens portion is formed as a curved plate and is curved forwardly, said rear lens portion being a convex lens.

3. The lens module as claimed in claim 1, wherein said front lens portion has a main body segment, and a protruding segment extending forwardly from said main body segment, said main body segment abutting against said front cover, said protruding segment being exposed from said light outlet hole.

4. The lens module as claimed in claim 1, wherein said front cover includes a plurality of pins, said rear cover having a plurality of pin holes, said pins being respectively inserted into said pin holes.

5. The lens module as claimed in claim 4, wherein said front lens portion has a plurality of engaging grooves recessing towards the optical axis, said pins being respectively engaged with said engaging grooves.

6. A car light comprising:

said lens module as claimed in claim 1; and a light source module disposed on said lens module and opposite to said light outlet hole.

7. The car light as claimed in claim 6, wherein said light source module includes a heat sink, at least one first light source unit mounted to said heat sink, and at least one reflective cover disposed over said at least one first light source unit.

8. The car light as claimed in claim 7, wherein:

said heat sink has a platform surface, and an inclined surface extending downwardly from a front end of said platform surface and inclined towards said light outlet hole; and said at least one first light source unit includes two first light source units mounted respectively to said platform surface and said inclined surface.

9. The car light as claimed in claim 8, wherein:

said light source module further includes a first light-transmitting member mounted to said heat sink, and disposed in front of one of said first light source units that is mounted to said inclined portion; and said at least one reflective cover is mounted to said heat sink, and is disposed over another one of said first light source units that is mounted to said platform surface.

10. The car light as claimed in claim 7, wherein said light source module further includes two second light source units, said heat sink having a base seat portion and two side wing portions that are connected respectively to opposite left and right ends of said base seat portion, said reflective cover and said at least one first light source unit being mounted to said base seat portion, said second light source units being respectively mounted to said side wing portions.

11. The car light as claimed in claim 10, wherein said lens module further includes two second light-transmitting members embedded in said rear cover, each of said second light-transmitting members being in front of a respective one of said second light source units and being aligned with a corresponding one of said vertices of said front lens portion of said lens.

* * * * *